United States Patent
Hagiwara et al.

(10) Patent No.: US 10,663,603 B2
(45) Date of Patent: May 26, 2020

(54) SCINTILLATOR PANEL

(71) Applicant: Konica Minolta Inc., Tokyo (JP)

(72) Inventors: Kiyoshi Hagiwara, Hino (JP); Hiromichi Shindou, Hachioji (JP)

(73) Assignee: Konica Minolta, Inc., Tokyo (JP)

(\*) Notice: Subject to any disclaimer, the term of this patent is extended or adjusted under 35 U.S.C. 154(b) by 0 days.

(21) Appl. No.: 16/246,959

(22) Filed: Jan. 14, 2019

(65) Prior Publication Data
US 2019/0219712 A1   Jul. 18, 2019

(30) Foreign Application Priority Data
Jan. 16, 2018   (JP) .................. 2018-005015

(51) Int. Cl.
*G01T 1/20* (2006.01)

(52) U.S. Cl.
CPC .............. *G01T 1/2002* (2013.01); *G01T 1/20* (2013.01); *G01T 1/2018* (2013.01)

(58) Field of Classification Search
CPC ........... G01T 1/18; G01T 1/20; G01T 1/2002; G01T 1/2018
See application file for complete search history.

(56) References Cited

U.S. PATENT DOCUMENTS 5,519,227 A \* 5/1996 Karellas .................. G01T 1/202
250/370.11

FOREIGN PATENT DOCUMENTS

WO   2014/080941         5/2014
WO   WO-2014080941 A1 \* 5/2014 ........... G01T 1/2002

OTHER PUBLICATIONS

Rutishauser et al., "Structured scintillator for hard x-ray grating interferometry," Applied Physics Letter 98, 171107, 3 pages, (2011).

\* cited by examiner

*Primary Examiner* — Mark R Gaworecki
(74) *Attorney, Agent, or Firm* — Rankin, Hill & Clark LLP (57) ABSTRACT

A scintillator panel includes a laminated scintillator having a structure obtained by repeatedly disposing a scintillator layer and a non-scintillator layer in a direction substantially parallel to an incident direction of a radiation, wherein the scintillator layer contains at least a phosphor, a binder resin, and voids, and the non-scintillator layer is transparent, and an average refractive index n1 of the binder resin and the voids of the scintillator layer and a refractive index n2 of the non-scintillator layer satisfy a relationship of formula (A) $0.9 \leq (n2/n1)$.

6 Claims, 4 Drawing Sheets

SCINTILLATOR PANEL

The entire disclosure of Japanese patent Application No. 2018-005015, filed on Jan. 16, 2018, is incorporated herein by reference in its entirety.

BACKGROUND

Technological Field

The present invention relates to a novel scintillator panel suitable for a Talbot system or the like.

Description of the Related Art

At present, in X-ray image diagnosis, an absorption image obtained by converting attenuation of an X-ray after the X-ray passes through an object into an image is used. Meanwhile, an X-ray is one of electromagnetic waves, and therefore attention is paid to this wave nature. An attempt to convert a change in phase after an X-ray passes through an object into an image has been made recently. These are called absorption contrast and phase contrast, respectively. An imaging technique using this phase contrast has higher sensitivity to a light element than conventional absorption contrast, and therefore is considered to have high sensitivity to human soft tissues containing a large amount of light element.

However, a conventional phase contrast imaging technique requires use of a synchrotron X-ray source and a micro focus X-ray tube, the former requires huge facilities, and the latter cannot secure a sufficient X-ray dose due to imaging a human body. Therefore, practical use of the conventional phase contrast imaging technique in general medical facilities has been considered to be difficult.

In order to solve the problem, X-ray image diagnosis (Talbot system) using an X-ray Talbot-Lau interferometer, capable of acquiring a phase contrast image using an X-ray source conventionally used at a medical site, has been expected.

Figure 4:
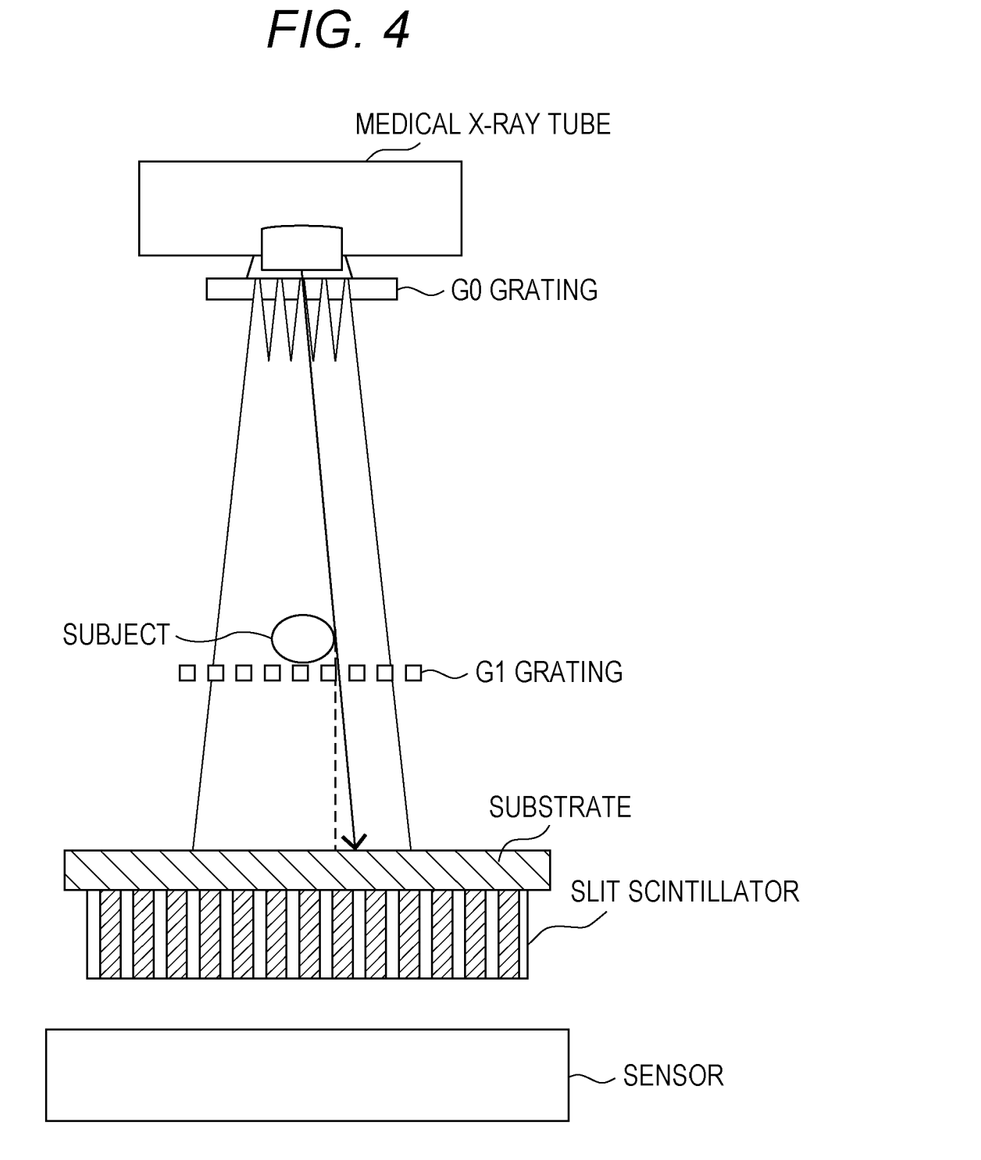
FIG. 4 is a schematic configuration diagram of the Talbot scintillator.

In the Talbot-Lau interferometer, as illustrated in FIG. 4, a G0 grating, a G1 grating, and a G2 grating are disposed between a medical X-ray tube and FPD, and refraction of an X-ray due to a subject is visualized as moire fringes. An X-ray is emitted in a longitudinal direction from an X-ray source disposed in an upper part and reaches an image detector through G0, a subject, G1, and G2.

As a method for manufacturing a grating, for example, a method is known in Which a silicon wafer having high X-ray transmittance is etched to form a grating-shaped recess and a heavy metal having a high X-ray shielding property is filled therein.

However, with the above method, it is difficult to increase the area due to restrictions on the size of an available silicon wafer, an etching apparatus, and the like, and the object to be imaged is limited to a small portion. In addition, it is not easy to form a deep recess in a silicon wafer by etching, and it is also difficult to evenly fill a metal in a deep portion of the recess. Therefore, it is difficult to manufacture a grating having a thickness enough to sufficiently shield an X-ray. For this reason, particularly under high-voltage imaging conditions, an X-ray passes through a grating, and a favorable image cannot be obtained.

Therefore, a slit scintillator that imparts a grating function to a scintillator and makes the scintillator emit light in a slit shape attracts attention.

For example, Applied Physics Letter 98, 171107 (2011) "Structured scintillator for x-ray grating interferometry" (Paul Scherrer Institute (PSI)) discloses a grating-shaped scintillator in which a phosphor (CsI) is filled in a groove of a grating manufactured by etching a silicon wafer.

However, in the above-described method, a silicon wafer is used as in the above-described method for manufacturing a G2 grating, and therefore the situation in which the area is restricted and thickening is difficult, which are problems caused by the silicon wafer, has not been improved. Furthermore, a new problem that light emitted by CsI attenuates by repeating collision on a wall surface of a silicon grating and brightness is lowered occurs. In addition, under high-voltage imaging conditions, there is still a problem that an X-ray passes through a grating, and a favorable image cannot be obtained.

For this reason, there has been a desire for appearance of a new scintillator having no restrictions on a portion to be imaged and capable of imaging a thick subject.

For example, as a partitioned scintillator having a scintillator layer filled in a cell partitioned by a partition wall, WO 2014/080941 has proposed that by constituting a partition wall with a material containing a low melting point glass as a main component, constituting the scintillator layer with a phosphor and a binder resin, and filling the binder resin contained in the scintillator layer in the vicinity of the phosphor, scattering of light due to a surface of the phosphor can be suppressed and light scattering due to a surface of the partition wall is also suppressed.

Therefore, the present inventors have paid attention to a scintillator having a slit structure formed of a laminate including a scintillator layer and a non-scintillator layer as a new scintillator having a grating shape. In time scintillator having a slit structure, an X-ray with which the scintillator is irradiated emits light in a scintillator layer, while the X-ray passes through the non-scintillator layer, and emitted light is detected by a sensor.

However, a scintillator having such a slit structure structurally has a non-scintillator layer and a scintillator layer alternately laminated. Therefore, there is usually a problem that the amount of the scintillator is ½, and brightness is low. For this reason, the present inventors have considered that efficiently guiding light emitted by the scintillator of a laminated scintillator panel to the non-scintillator layer made of a transparent resin leads to improvement in brightness.

However, an interface between the scintillator layer and the transparent resin layer constituting the slit scintillator has irregularities and voids due to a manufacturing process through lamination pressure bonding. Even in such a state, it is important to efficiently extract emitted light for improving brightness.

Incidentally, the partitioned scintillator disclosed in WO 2014/080941 forms a reflection layer on a cell wall surface, and returns emitted light to the scintillator layer in the reflection layer or suppresses passing of light through an adjacent cell, and is completely different from the present invention in object and solution.

SUMMARY

In such a circumstance, the present inventors made intensive studies to solve the above problems. As a result, the present inventors reviewed the configuration of the laminated scintillator panel, and have found that the above problems are solved by causing refraction of emitted light at an interface between a scintillator layer and a non-scintillator layer to efficiently guide the light into the non-scintillator layer while an average refractive index of constituent materials in the scintillator layer and a refractive index of a transparent resin constituting the non-scintillator layer satisfy a predetermined relationship, and a scintillator panel having high brightness and MTF can be obtained, resulting in completion of the present invention.

To achieve the abovementioned object, according to an aspect of the present invention, a scintillator panel reflecting one aspect of the present invention comprises a laminated scintillator having a structure obtained by repeatedly disposing a scintillator layer and a non-scintillator layer in a direction substantially parallel to a incident direction of a radiation, wherein the scintillator layer contains at least a phosphor, a binder resin, and voids, and the non-scintillator layer is transparent, and an average refractive index n1 of the binder resin and the voids of the scintillator layer and a refractive index n2 of the non-scintillator layer satisfy a relationship of formula (A) $0.9 \leq (n2/n1)$.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Hereinafter, a scintillator panel according to an embodiment of the present invention will be described.

Figure 1:
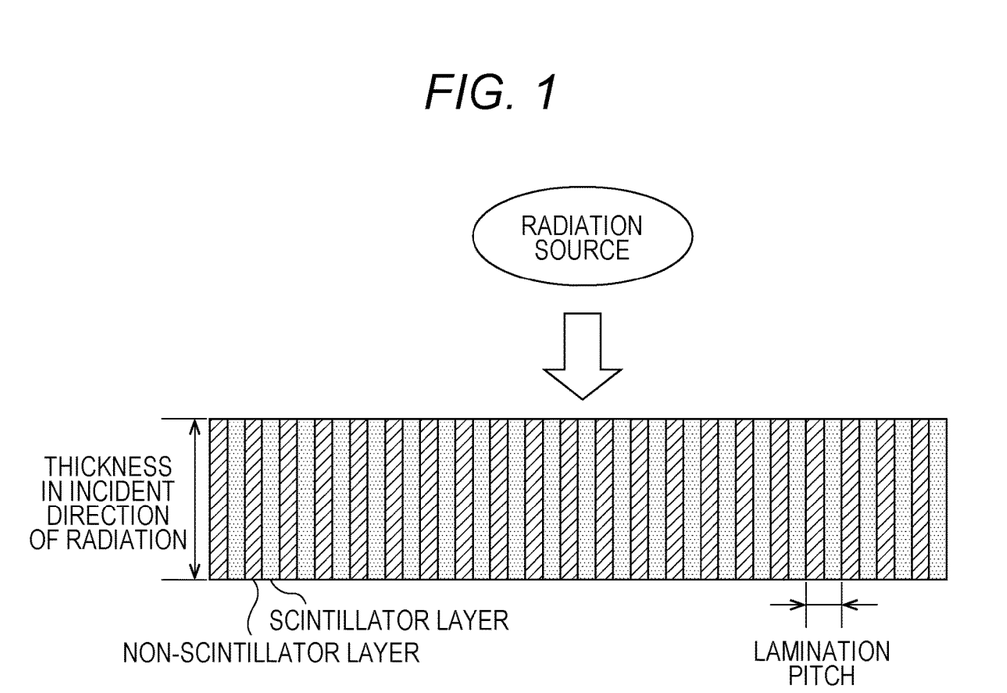
FIG. 1 is a schematic view of a scintillator panel according to an embodiment of the present invention.

As illustrated in FIG. 1, the scintillator panel according to an embodiment of the present invention includes a laminated scintillator having a structure obtained by repeatedly laminating a scintillator layer having a function of emitting light by receiving an X-ray and a non-scintillator layer in a direction substantially parallel to an incident direction of a radiation. Light emitted by a radiation in the scintillator layer can be converted into an electric signal via a detector to acquire a digital image.

Note that being substantially parallel means being almost parallel. Being perfectly parallel and being parallel with some inclination or curvature are included in a category of substantially parallel. Such a slit-shaped scintillator can also increase the area.

The thickness of a pair of scintillator layer and non-scintillator layer in a direction perpendicular to an incident direction, that is, the thickness thereof in a lamination direction (hereinafter referred to as a lamination pitch) and a ratio of the thickness in the lamination direction between the scintillator layer and the non-scintillator layer (hereinafter referred to as a duty ratio) are derived from Talbot interference conditions, and are generally preferably 0.5 to 50 μm and 30/70 to 70/30, respectively. In order to obtain a diagnostic image with a sufficient area, the repeated lamination number in a lamination pitch is preferably 1,000 to 500,000.

Scintillator Layer

The scintillator layer in an embodiment of the present invention is a layer containing a scintillator as a main component, and contains phosphor particles functioning as a scintillator, a binder resin, and voids.

As the scintillator, it is possible to appropriately use a substance which can convert a radiation such as an X-ray into light having a different wavelength such as visible light. Specifically, a scintillator and a phosphor described at pp. 284 to 299 of "Phosphor Handbook" (edited by Phosphor Research Society, Ohmsha, Ltd., 1987) and a substance described in "Scintillation Properties (http://scintillator.lbl.gov/)" (Web homepage of U.S. Lawrence Berkeley National Laboratory) can be used. However, even a substance not described here can be used as a scintillator as long as the substance "can convert radiation such as an X-ray into light having a different wavelength such as visible light".

Specific examples of the composition of the scintillator include the following. First, examples of the composition of the scintillator include a metal halide-based phosphor represented by a basic composition formula (I): $M_I X \cdot a M_{II} X'_2 \cdot b M_{III} X''_3 : zA$.

In the above basic composition formula (I), $M_I$ represents an element which can become a monovalent cation, that is, at least one selected from the group consisting of lithium (Li), sodium (Na), potassium (K), rubidium (Rb), cesium (Cs), thallium (Ti), silver (Ag), and the like.

$M_{II}$ represents an element which can become a divalent cation, that is, at least one selected from the group consisting of beryllium (Be), magnesium (Mg), calcium (Ca), strontium (Sr), barium (Ba), nickel (Ni), copper (Cu), zinc (Zn), cadmium (Cd), and the like.

$M_{III}$ represents at least one selected from the group consisting of scandium (Sc), yttrium (Y), aluminum (Al), gallium (Ga), indium (In), and elements belonging to lanthanoid.

X, X', and X" each represent a halogen element, and may represent different elements or the same element.

A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth).

a, b, and z independently represent values within ranges of $0 \leq a < 0.5$, $0 \leq b < 0.5$, and $0 < z < 1.0$, respectively.

In addition, examples of the composition of the scintillator further include a rare earth activated metal fluorohalide-based phosphor represented by a basic composition formula (II): $M_{II} FX:zLn$.

In the above basic composition formula (II), $M_{II}$ represents at least one alkaline earth metal element, Ln represents at least one element belonging to lanthanoid, and X represents at least one halogen element. z represents a value within a range of $0 < z \leq 0.2$.

In addition, examples of the composition of the scintillator further include a rare earth oxysulfide-based phosphor represented by a basic composition formula (III): $Ln_2O_2S:zA$.

In the above basic composition formula (III), Ln represents at least one element belonging to lanthanoid, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth). z represents a value within a range of 0<z<1.

Particularly, $Gd_2O_2S$ using gadolinium (Gd) as Ln is preferable because it is known that by using terbium (Tb), dysprosium (Dy), or the like as an element of A, $Gd_2O_2S$ exhibits high luminous characteristics in a wavelength region in which a sensor panel receives light most easily.

In addition, examples of the composition of the scintillator further include a metal sulfide-based phosphor represented by a basic composition formula (IV): $M_{II}S{:}zA$.

In the above basic composition formula (IV), $M_{II}$ represents an element which can become a divalent cation, that is, at least one element selected from the group consisting of an alkaline earth metal, zinc (Zn), strontium (Sr), gallium (Ga), and the like, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth). z represents a value within a range of 0<z<1.

In addition, examples of the composition of the scintillator further include a metal oxoate-based phosphor represented by a basic composition formula (V): $M_{IIa}(AG)_b{:}zA$.

In the above basic composition formula (V), $M_{II}$ represents a metal element which can become a cation, (AG) represents at least one oxo acid group selected from the group consisting of a phosphate, a borate, a silicate, a sulfate, a tungstate, and an aluminate, and A represents at least one element selected from the group consisting of Y, Ce, Pr, Nd, Sm, Eu, Gd, Tb, Dy, Ho, Er, Tm, Yb, Na, Mg, Cu, Ag (silver), Tl, and Bi (bismuth).

a and b represent any value which can be according to a valence of a metal or an oxo acid group. z represents a value within a range of 0<z<1.

In addition, examples of the composition of the scintillator further include a metal oxide-based phosphor represented by a basic composition formula (VI): $M_aO_b{:}zA$.

In the above basic composition formula (VI), M represents at least one element selected from metal elements which can become cations.

A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth).

a and b represent any value which can be according to a valence of a metal or an oxo acid group. z represents a value within a range of 0<z<1.

In addition, examples of the composition of the scintillator further include a metal acid halide-based phosphor represented by a basic composition formula (VII): $LnOX{:}zA$.

In the above basic composition formula (VII), Ln represents at least one element belonging to lanthanoid, X represents at least one halogen element, and A represents at least one element selected from the group consisting of Y, Ce, Pr, Nd, Sm, Eu, Gd, Tb, Dy, Ho, Er, Tm, Yb, Lu, Na, Mg, Cu, Ag (silver), Tl, and Bi (bismuth). z represents a value within a range of 0<z<1.

The average particle diameter of the phosphor particles constituting the scintillator is selected according to the thickness of the scintillator layer in the lamination direction and is preferably 100% or less, and more preferably 90% or less with respect to the thickness of the scintillator layer in the lamination direction. If the average particle diameter of the phosphor particles exceeds the above range, disorder of the lamination pitch increases, and a Talbot interference function decreases.

The scintillator layer contains a binder resin as a binder of phosphor particles. The binder resin is preferably a material transparent to an emission wavelength of the scintillator so as not to inhibit propagation of light emitted from the scintillator.

The binder resin is not particularly limited as long as keeping an object of the present invention, and examples of the binder resin include a natural polymer such as protein (for example, gelatin), a polysaccharide (for example, dextran), or gum arabic; and a synthetic polymer such as polyvinyl butyral, polyvinyl acetate, nitrocellulose, ethylcellulose, a vinylidene chloride-vinyl chloride copolymer, poly (meth)acrylate, a vinyl chloride-vinyl acetate copolymer, polyurethane, cellulose acetate butyrate, polyvinyl alcohol, polyester, an epoxy resin, a polyolefin resin, a polyamide resin, a polyurethane-based resin, or an acrylic resin. Incidentally, these resins may be crosslinked with a crosslinking agent such as epoxy or isocyanate, and these binder resins may be used singly or in combination of two or more kinds thereof.

The binder resin may be either a thermoplastic resin or a thermosetting resin. A hot inch resin may be used in consideration of a manufacturing process described later. For the hot-melt resin, for example, a resin containing a polyolefin-based resin, a polyamide-based resin, a polyester-based resin, a polyurethane-based resin, or an acrylic resin as a main component can be used. Among these resins, a resin containing a polyolefin-based resin as a main component is preferable from viewpoints of light transmittance, moisture resistance, and adhesiveness. Examples of the polyolefin-based resin include an ethylene-vinyl acetate copolymer (EVA), an ethylene-acrylic acid copolymer (EAA), an ethylene-acrylate copolymer (EMA), an ethylene-methacrylic acid copolymer (EMAA), an ethylene-methacrylate copolymer (EMMA), and an ionomer resin. Note that these resins may be used as a so-called polymer blend obtained by combining two or more kinds thereof.

The content of the binder resin in the scintillator layer is preferably 1 to 70 vol %, more preferably 5 to 50 vol %, and still more preferably 10 to 30 vol %. If the content is lower than the lower limit of the above range, sufficient adhesiveness cannot be obtained. Conversely, if the content is higher than the upper limit of the above range, the content of the scintillator is insufficient, and the amount of light emitted decreases.

The voids are present in the scintillator layer or at an interface between the scintillator layer and the non-scintillator layer. A porosity is not particularly limited as long as satisfying a predetermined refractive index. Note that the porosity is calculated according to the following formula using a measured volume (area×thickness) of a laminate and a theoretical volume (weight/density) of the laminate.

(Measured volume of laminate−theoretical volume of laminate)/theoretical volume of laminate×100

If the area of a laminate is constant, the porosity is calculated according to the following formula using a measured thickness of the laminate and a theoretical thickness (weight/density/area) of the laminate.

(Measured thickness of laminate−theoretical thickness of laminate)/theoretical thickness of laminate×100

The porosity of the scintillator layer is preferably more than 0 and 30 vol % or less. If the porosity exceeds the above range, a filling ratio of the scintillator may decrease, and the brightness may be lowered.

As a unit for forming voids inside the scintillator layer, for example, the scintillator layer may contain bubbles in a process of manufacturing the scintillator layer, or hollow polymer particles may be added to the scintillator layer. As a unit for forming irregularities on a surface of the scintillator layer or the non-scintillator layer, for example, an irregular treatment such as a blast treatment or an emboss treatment may be applied to a surface of the layer. In a case where the scintillator layer is formed by applying a composition containing phosphor particles and a binder resin onto a polymer film, irregularities are formed on a surface of the scintillator layer, and voids can be formed at a contact interface with the polymer film. The sizes of the irregularities can be arbitrarily adjusted by controlling the particle diameters and dispersiveness of phosphor particles.

Non-Scintillator Layer

The non-scintillator layer in an embodiment of the present invention is a layer not containing a scintillator as a main component, and the content of the scintillator in the non-scintillator layer is less than 10 vol %, preferably less than 1 vol %, and most preferably 0 vol %.

The non-scintillator layer desirably contains various glasses, a polymer material, a metal, or the like as a main component. These materials may be used singly or in combination of a plurality of kinds thereof.

Specific examples of a component of the non-scintillator layer include: a plate glass such as quartz, a borosilicate glass, or a chemically reinforced glass; a ceramic such as sapphire, silicon nitride, or silicon carbide;

a semiconductor such as silicon, germanium, gallium arsenide, gallium phosphorus, or gallium nitrogen;

a polymer such as a polyester including polyethylene terephthalate (PET) and polyethylene naphthalate (PEN), an aliphatic polyamide including nylon, an aromatic polyamide (aramid), polyimide, polyamideimide, polyetherimide, polyethylene, polypropylene, polycarbonate, triacetate, cellulose acetate, epoxy, bismaleimide, polylactic acid, a sulfur-containing polymer including poll phenylene sulfide and polyethersulfone, polyetheretherketone, a fluorocarbon resin, an acrylic resin, or polyurethane;

a carbon fiber or a glass fiber (particularly a fiber-reinforced resin sheet including these fibers);

a metal foil such as aluminum, iron, or copper; and a bionanofiber including chitosan and cellulose.

As the non-scintillator layer, a film-shaped non-scintillator layer is preferable from a viewpoint of handling during manufacture.

In an embodiment of the present invention, in order to guide light to a light detection sensor or the like through the inside of a non-scintillator, the non-scintillator layer is preferably formed of a transparent material, particularly preferably formed of a transparent resin.

The transparent resin is not particularly limited as long as satisfying the following refractive index. However, among the above-described polymers, polyethylene terephthalate (PET) is particularly preferable.

The non-scintillator layer preferably further contains transparent fine particles together with the transparent resin. The transparent fine particles are not particularly limited as long as the non-scintillator layer satisfies a refractive index as described below. However, in general, examples of the transparent fine particles include organic resin particles formed of a thermoplastic resin such as a methyl methacrylate polymer, a methyl methacrylate-methyl acrylate copolymer, a methyl methacrylate-styrene copolymer, or a styrene polymer. Inorganic fine particles such as talc, glass beads, silicone particles, an inorganic oxide, an inorganic nitride, or metal salt particles (for example, a carbonate, a sulfate, or a chloride) can also be used. Incidentally, even if the refractive index of a material itself is high, the refractive index of the whole layer can be adjusted by an average particle diameter. Therefore, a material of the transparent fine particles itself does not need to be transparent.

Examples of the inorganic fine particles include a white pigment such as $TiO_2$ (anatase type or rutile type), MgO, $PbCO_3 \cdot Pb(OH)_2$, $BaSO_4$, $Al_2O_3$, M(II)FX (M(II): at least one atom selected from Ba, Sr, and Ca, X: Cl atom or Br atom), $CaCO_3$, ZnO, $Sb_2O_3$, $SiO_2$, $ZrO_2$, lithopone [$BaSO_4 \cdot ZnS$], talc, magnesium silicate, basic silisulfate, basic lead phosphate, or aluminum silicate. Examples of the inorganic fine particles further include glass beads, resin beads, hollow particles having a hollow part therein, multi hollow particles having many hollow parts therein, and porous particles. These particles may be used singly or in combination of two or more kinds thereof.

The blending amount of the transparent resin and the transparent fine particles is adjusted such that the non-scintillator layer has a predetermined refractive index. If the transparent fine particles are contained, adjustment of the refractive index is easy, and light is also refracted/scattered at a particle interface. Therefore, emitted light can efficiently pass through the non-scintillator layer. The content of the transparent fine particles is desirably 10% by mass or less, and preferably 0.5 to 10% by mass.

Figure 2:
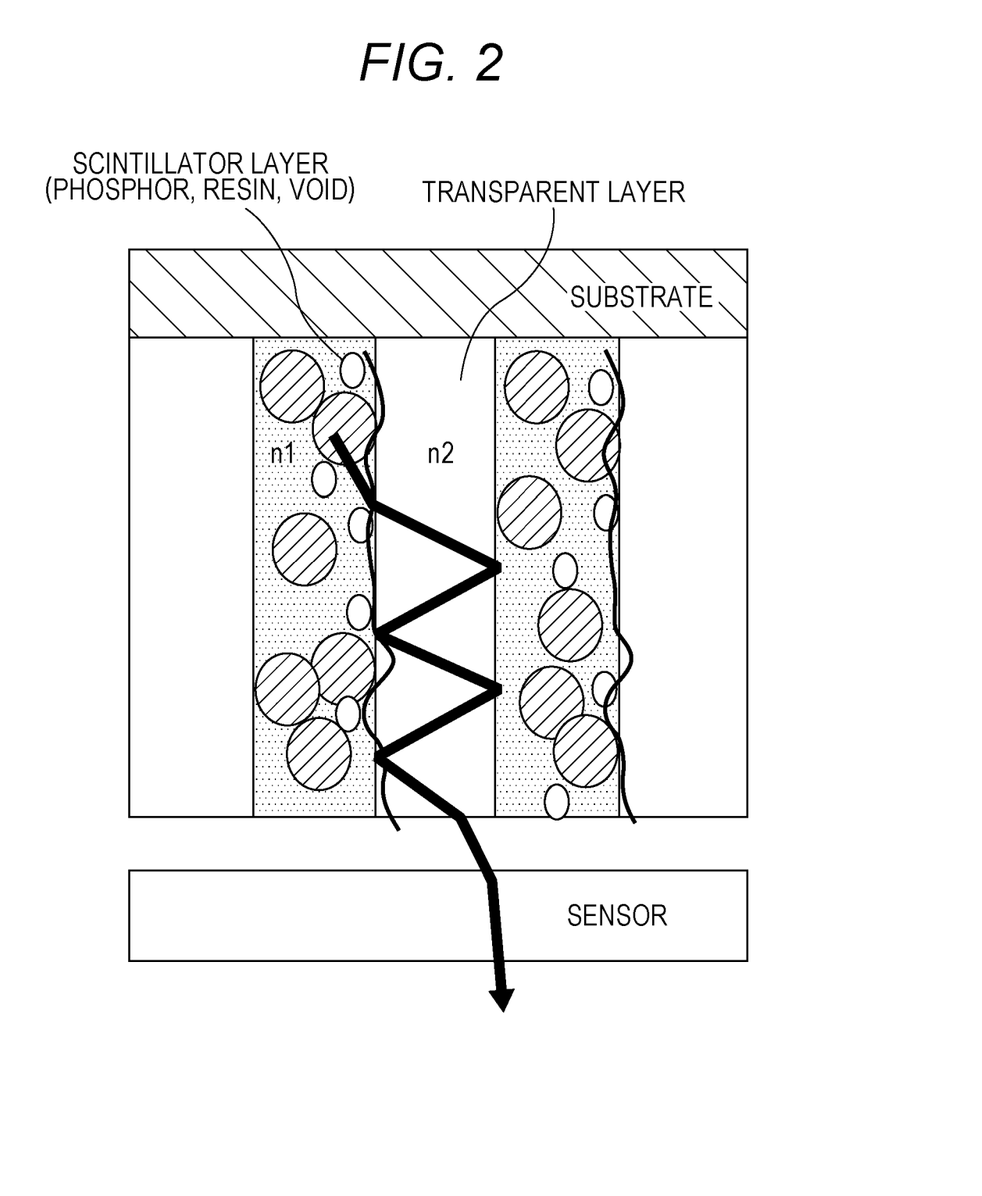
FIG. 2 is an enlarged view of a main part of the scintillator panel according to an embodiment of the present invention.

FIG. 2 illustrates an enlarged view of a main part of a laminated scintillator. An average refractive index n1 of a binder resin and voids of the scintillator layer and a refractive index n2 of the non-scintillator layer satisfy a relationship represented by formula (A).

$$0.9 \leq (n2/n1) \qquad (A)$$

An interface between the scintillator layer and the non-scintillator layer has irregularities and voids due to a manufacturing process through lamination pressure bonding. Usually, the irregularities or voids scatter light, and light does not reach a detector in some cases. Note that the voids are usually filled with air.

Meanwhile, if the relationship of the refractive index represented by the above formula (A) is satisfied, light is efficiently taken into the non-scintillator layer by refraction at an interface between the scintillator layer and the non-scintillator layer. Note that the average refractive index n1 of the binder resin and the voids of the scintillator layer can be determined by calculation from a composition ratio between the binder resin and the voids (filled with air).

Snell's law represents a relationship between an incident angle and an exit angle (furthermore, the refractive index of a medium) when a light beam is incident on a plane (a boundary between media having different refractive indices). If the incident angle of a light beam is represented by θ1, the refraction angle (exit angle) of the light beam is represented by θ2, the reflection angle of the light beam is represented by θ3, the refractive index of a medium on an incident side is represented by n1, and the refractive index of the medium on an exit side is represented by n2, Snell's law is represented by n1 sin θ1=n2 sin θ2. Provided that n1<n2 is satisfied. Therefore, when 1.0<(n2/n1) is satisfied, theoretically, total reflection does not occur, and light can be extracted. However, in a case of such a laminated scintillator as in an embodiment of the present invention, if the above formula (A) is satisfied in view of the irregularities and voids at an interface, light in the scintillator layer can be efficiently guided to the non-scintillator layer.

Meanwhile, as the refractive index of the non-scintillator layer increases, propagation of light in a lateral direction in the non-scintillator layer widens, and sharpness may be lowered.

Therefore, the average refractive index n1 of the binder resin and the voids of the scintillator layer and the refractive index n2 of the non-scintillator layer preferably further satisfy a relationship represented by formula (B).

$$0.9 \leq (n2/n1) \leq 1.2 \tag{B}$$

The laminated scintillator is manufactured by laminating the scintillator layer and the non-scintillator layer and joining the scintillator layer and the non-scintillator layer to each other. Joining in an embodiment of the present invention means bonding the scintillator layer and the non-scintillator layer to each other to integrate the scintillator layer and the non-scintillator layer. As a joining method, both of the scintillator layer and the non-scintillator layer can be bonded to each other via an adhesive layer. However, it is preferable to join the scintillator layer and the non-scintillator layer to each other without an adhesive layer interposed therebetween by adding an adhesive resin to the scintillator layer or the non-scintillator layer beforehand and bringing the scintillator layer and the non-scintillator layer into close contact with each other by pressurization from a viewpoint of simplification in process. In an embodiment of the present invention, the scintillator layer contains a binder resin which is an adhesive resin, and therefore joining can be performed without an adhesive layer interposed between the scintillator layer and the non-scintillator layer.

In addition, heating under a pressurized condition is more preferable because an adhesive substance is inched or cured to strengthen adhesion. In addition, the scintillator layer and the non-scintillator layer can be joined to each other by coating a surface of the non-scintillator layer with a composition capable of forming the scintillator layer or by further removing a solvent as necessary.

As a method for forming the scintillator layer, a top surface of the non-scintillator layer may be coated with a composition in which the phosphor particles and a binder resin are dissolved or dispersed in a solvent or a composition prepared by heating and melting a mixture containing the phosphor particles and a binder resin.

In a case where a top surface of the non-scintillator layer is coated with a composition in which the phosphor particles and a binder resin are dissolved or dispersed in a solvent, examples of a usable solvent include a lower alcohol such as methanol, ethanol, isopropanol, or n-butanol, a ketone such as acetone, methyl ethyl ketone, methyl isobutyl ketone, or cyclohexanone, an aromatic compound such as toluene, benzene, cyclohexane, cyclohexanone, or xylene; an ester of a lower fatty acid such as methyl acetate, ethyl acetate, or n-butyl acetate and a lower alcohol, an ether such as dioxane, ethylene glycol monoethyl ether, ethylene glycol monomethyl ether, methoxypropanol propylene glycol monomethyl ether, or propylene glycol monomethyl ether acetate, benzenetriol, a halogenated hydrocarbon such as methylene chloride or ethylene chloride, and mixtures thereof. The composition may include various additives such as a dispersant for improving dispersiveness of phosphor particles in the composition, or a curing agent or a plasticizer for improving a bonding force between a binder resin and the phosphor particles in the scintillator layer formed.

Examples of the dispersant used for such an object include phthalic acid, stearic acid, caproic acid, and a lipophilic surfactant.

A coating unit with a composition for forming the scintillator layer is not particularly limited, and a usual coating unit such as a doctor blade, a roll coater, a knife coater, an extrusion coater, a die coater, a gravure coater, a lip coater, a capillary type coater, or a bar coater can be used.

The laminated scintillator according to an embodiment of the present invention is formed through a step of repeatedly laminating the scintillator layer and the non-scintillator layer and then joining the scintillator layer and the non-scintillator layer to each other.

A method for repeatedly laminating the scintillator layer and the non-scintillator layer is not particularly limited. The scintillator layer and the non-scintillator layer may be each individually formed, may be each divided into a plurality of sheets, and then the sheets may be laminated alternately and repeatedly.

In an embodiment of the present invention, preferably, a plurality of partial laminates in which the scintillator layer and the non-scintillator layer are joined to each other is formed, and then the plurality of partial laminates is laminated to form the laminate because the lamination number and the thickness of the laminate can be easily adjusted.

For example, a partial laminate formed of a pair of scintillator layer and non-scintillator layer may be formed in advance, the partial laminate may be divided into a plurality of sheets, and the sheets may be laminated repeatedly. At this time, a desired functional layer is separately disposed in any sheet, and it is only required to perform lamination such that the functional layers are disposed at an appropriate interval.

If a partial laminate formed of the scintillator layer and the non-scintillator layer has a film shape that can be wound up, lamination can be efficiently performed by winding the partial laminate around a core. The winding core may be cylindrical or flat. More efficiently, a repeated laminate of scintillator layers and non-scintillator layers, manufactured by the above method, may be joined (integrated) to each other by pressurization, heating, or the like, then may be divided into a plurality of sheets, and the sheets may be repeatedly laminated.

When the partial laminate is laminated, it is only required to dispose functional layers such that the functional layers are disposed at a predetermined layer interval.

A method for forming a partial laminate formed of the scintillator layer and the non-scintillator layer is not particularly limited. A polymer film may be selected as the non-scintillator layer, and one surface thereof may be coated with a composition containing phosphor particles and a binder resin to form the scintillator layer. Both surfaces of the polymer film may be coated with a composition containing phosphor particles and a binder resin.

As described above, when the partial laminate is formed by coating a top surface of a film constituting the non-scintillator layer with a composition containing phosphor particles and a binder resin, a process can be simplified, and division into a plurality of sheets is easy. A dividing method is not particularly limited, and an ordinary cutting method is selected.

In addition, a transfer substrate coated with the scintillator layer in advance may be transferred onto a film made of the non-scintillator layer. The transfer substrate is detached by a unit such as peeling as necessary.

In an embodiment of the present invention, the scintillator layer and the non-scintillator layer are joined to each other by pressurizing the laminate such that the scintillator layer and the non-scintillator layer are substantially parallel to an incident direction of a radiation.

By heating the repeated laminate of the plurality of scintillator layers and non-scintillator layer in a state pressurized so as to have a desired size, the lamination pitch can be adjusted to a desired value.

A method for pressurizing the repeated laminate of the plurality of scintillator layers and non-scintillator layer so as to have a desired size is not particularly limited. However, the repeated laminate is preferably pressurized while a spacer made of a metal or the like is disposed in advance in order to prevent the laminate from being compressed to a desired size or less. A pressure at this time is preferably 1 MPa to 10 GPa. If the pressure is lower than the lower limit of the above range, it may be impossible to deform a resin component contained in the laminate to a predetermined size. If the pressure is higher than the upper limit of the above range, a spacer may be deformed, and the laminate may be compressed to a desired size or less. By heating the laminate in a pressurized state, joining can be stronger.

Conditions for heating the repeated laminate of a plurality of scintillator layers and non-scintillator layer depend on the kind of a resin. However, a thermoplastic resin is preferably heated at a temperature equal to or higher than a glass transition point, and a thermosetting resin is preferably heated at a temperature equal to or higher than a curing temperature for about 0.5 to 24 hours. The heating temperature is generally preferably 40° C. to 250° C. If the temperature is lower than the lower limit of the above range, fusion or curing reaction of a resin may be insufficient, and poor joining may occur, or the repeated laminate may return to the original size thereof when compression is released. If the temperature is higher than the upper limit of the above range, a resin may change in quality to impair optical characteristics. A method for heating the laminate in a pressurized state is not particularly limited. A press machine equipped with a heating element may be used. The laminate may be heated in an oven while being confined in a box-shaped jig so as to have a predetermined size. A box-shaped jig may be equipped with a heating element.

As a state before the repeated laminate of a plurality of scintillator layers and non-scintillator layers is pressurized, voids are present inside the scintillator layer, inside the non-scintillator layer, or at an interface between the scintillator layer and the non-scintillator layer. The voids function as a cushion at the time of pressurization. As a result, the laminate can be adjusted to an arbitrary size in a range until the voids disappear. That is, the lamination pitch can be adjusted to an arbitrary value.

A source emitting a radiation such as an X-ray is generally a point wave source. Therefore, in a case where the scintillator layers and the non-scintillator layers are formed completely in parallel with each other, in a peripheral region of the laminated scintillator, an X-ray is incident obliquely. As a result, in the peripheral region, a phenomenon that a radiation does not sufficiently pass therethrough, so called vignetting occurs. Vignetting becomes a more serious problem as the scintillator has a larger area.

This problem can be solved, in the laminated scintillator panel, if a radiation incident side is referred to as a first surface and a side facing the first surface is referred to as a second surface, by making the lamination pitch of the scintillator layer and the non-scintillator layer on the second surface larger than the lamination pitch of the scintillator layer and the non-scintillator layer on the first surface and disposing the scintillator layers and non-scintillator layers parallel to a radiation. Specifically, this problem can be solved by bending the laminated scintillator panel or forming the laminated scintillator panel into an inclined structure even if the laminated scintillator panel is not bent. In an embodiment of the present invention, by making both the first surface and the second surface of the inclined laminated scintillator panel flat, the scintillator panel can be in close contact with a generally rigid and flat photoelectric conversion panel as well. This scintillator panel is preferable from a viewpoint of improving image quality. Meanwhile, in a case where the laminated scintillator panel is bent, a photoelectric conversion panel also needs to follow the laminated scintillator panel. Therefore, the photoelectric conversion panel is preferably made of a flexible material.

In order to form the laminated scintillator panel into an inclined structure, for example, in a step of pressurizing the repeated laminate of a plurality of scintillator layers and non-scintillator layers, by making a pressurizing direction oblique, an inclined structure having a trapezoidal cross section can be formed. An inclination angle is maximized at an edge side of the laminated scintillator panel, and continuously becomes parallel toward the center. A maximum inclination angle is determined by the size of the laminated scintillator panel and a distance between the laminated scintillator panel and a radiation source, but is generally 0 to 10°. Examples of a pressurizing method for forming the inclined structure include use of a pressurizing jig having a predetermined inclination. Note that an inclination angle 0° is parallel, and the above range is included in the concept of "substantially parallel" here.

At an interface between the scintillator layer and the non-scintillator layer of the laminated scintillator panel, a functional layer such as a light shielding layer for suppressing diffusion of light emitted from the scintillator may be disposed in order to improve sharpness. The light shielding layer is not particularly limited as long as having a function of suppressing propagation of light emitted from a scintillator, and may have a light reflecting function or a light absorbing function, for example.

In an embodiment of the present invention, a joining end face where a plurality of scintillator layers and non-scintillator layer is joined to each other is preferably flattened. Particularly, by flattening a surface on a radiation incident side, the opposite side thereto, or both sides thereof, scattering of scintillator light at the joining end face can be suppressed, and sharpness is improved. A flattening method is not particularly limited, and energy such as an ion, a plasma, or an electron beam may be emitted in addition to machining such as cutting, grinding, or polishing. In the case of machining, machining is preferably performed in a direction parallel to a laminated structure of the scintillator layer and the non-scintillator layer so as not to damage the laminated structure.

The thickness of the laminated scintillator panel in an incident direction of a radiation in an embodiment of the present invention is a very thin value of several millimeters or less. Therefore, in order to maintain the laminated structure, a surface on a radiation incident side, the opposite side thereto, or both sides thereof are preferably bonded to a support to be held.

As the support, various glasses, a polymer material, a metal, and the like that can transmit a radiation such as an X-ray can be used. Examples thereof include a plate glass such as quartz, a borosilicate glass, or a chemically reinforced glass; a ceramic substrate such as sapphire, silicon nitride, or silicon carbide; a semiconductor substrate (photoelectric conversion panel) such as silicon, germanium, gallium arsenide, gallium phosphide, or gallium nitride; a polymer film (plastic film) such as a cellulose acetate film, a polyester resin film, a polyethylene terephthalate film, a polyamide film, a polyimide film, a triacetate film, or a polycarbonate film; a metal sheet such as an aluminum sheet, an iron sheet, or a copper sheet; a metal sheet having a cover layer of an oxide of the metal; a carbon fiber-reinforced resin (CFRP) sheet; and an amorphous carbon sheet. The support has a thickness preferably of 50 μm to 2,000 μm, more preferably of 50 to 1,000 μm.

A method for bonding the laminated scintillator panel to the support is not particularly limited. For example, an adhesive, a double-sided tape, or a hot-melt sheet can be used. After the laminated scintillator panel is bonded to the support, the opposite surface to the joining surface may be flattened.

A layer reflecting or absorbing light emitted from the scintillator may be disposed depending on an intended use between the laminated scintillator panel and the support. By disposing a layer reflecting light emitted from the scintillator, brightness is improved. By disposing a layer absorbing light emitted from the scintillator, sharpness is improved. The support itself may have a function of reflecting or absorbing light emitted from the scintillator.

Photoelectric Conversion Sensor

A scintillator panel according to an embodiment of the present invention further includes a photoelectric conversion sensor.

The photoelectric conversion sensor absorbs light emitted from the scintillator layer, converts the light into an electric signal by converting the light into a form of a charge, and outputs information included in the emitted light as an electric signal to the outside of a radiation detector. The photoelectric conversion sensor is not particularly limited as long as being able to perform a function thereof, and can be a conventionally known one.

In the photoelectric conversion sensor, a photoelectric conversion element is incorporated in a sensor panel. The configuration of the photoelectric conversion sensor is not particularly limited. However, usually, a substrate for a sensor panel of a photoelectric conversion element, an image signal output layer, and a photoelectric conversion element are laminated in this order.

The photoelectric conversion element may have any specific structure as long as having a function of absorbing light generated in the scintillator layer and converting the light into a form of a charge. For example, the photoelectric conversion element may include a transparent electrode, a charge generation layer excited by incident light to generate a charge, and a counter electrode. Any of the transparent electrode, the charge generation layer, and the counter electrode may be conventionally known ones. The photoelectric conversion element may be formed of an appropriate photosensor, and for example, may be formed of a plurality of photodiodes two-dimensionally disposed or a two-dimensional photosensor such as a charge coupled device (CCD) or a complementary metal-oxide-semiconductor (CMOS).

The image signal output layer accumulates a charge obtained by the photoelectric conversion element and outputs a signal based on the accumulated charge. The image signal output layer may have any structure as long as having such a function, and can be formed, for example, using a capacitor as a charge accumulating element that accumulates a charge generated by a photoelectric conversion element for each pixel and a transistor as an image signal output element that outputs an accumulated charge as a signal. Here, a thin film transistor (TFT) is exemplified as a preferable transistor.

In the photoelectric conversion sensor, a plurality of photoelectric conversion elements is disposed on a matrix in the same plane, each of the photoelectric conversion elements (pixels) converts an optical signal into an electric signal, and the electric signal is sequentially output outside an imaging element for each of the pixels.

A detection pixel (also referred to as a detector pixel, P1) of the photoelectric conversion element and the thickness (lamination pitch, P2) of a pair of scintillator layer and non-scintillator layer in a direction perpendicular to an incident direction preferably satisfy P1>P2. By forming the light detection pixel and the lamination pitch in this way, brightness and sharpness can be enhanced.

By causing the laminated scintillator panel to face the photoelectric conversion panel, light emitted from the scintillator by a radiation can be converted into an electric signal, and a digital image can be acquired. The laminated scintillator panel and the photoelectric conversion panel may face each other while being not in a contact with each other. However, in order to reduce optical loss at an interface between the laminated scintillator panel and the photoelectric conversion panel, the scintillator panel and the photoelectric conversion panel are preferably joined to each other with a transparent material (light transmitting material) having a refractive index of more than 1.0 (air).

Light Transmitting Material Layer

A light transmitting material layer is formed of an organic resin. The light transmitting material layer may have a multilayer structure or may include an air layer, an adhesive functional layer, and the like.

The light transmitting material layer is formed so as to be in close contact with each of a surface of the laminated scintillator and a surface of the photoelectric conversion element sensor.

The thickness of the light transmitting material layer needs to be reduced in order to prevent diffuse of light emitted from the laminated scintillator, and is preferably 50 μm or less, and more preferably 30 μm or less.

A component constituting the light transmitting material layer is not particularly limited as long as an object of the present invention is not impaired, but a thermosetting resin, a hot-melt sheet, or a pressure-sensitive adhesive sheet is preferable.

Examples of the thermosetting resin include a resin containing an acrylic resin, an epoxy-based resin, a silicone-based resin, or the like as a main component. Among the resins, a resin containing an acrylic resin or a silicone-based resin as a main component is preferable from a viewpoint of low temperature thermosetting. Examples of commercially available products thereof include methyl silicone-based JCR6122 manufactured by Dow Corning Toray Co., Ltd.

The hot-melt sheet in an embodiment of the present invention is a sheet-shaped adhesive resin (hereinafter referred to as a hot-melt resin) which is solid at room temperature and is made of a nonvolatile thermoplastic material without containing water or a solvent. By inserting a hot-melt sheet between adherends, melting the hot-melt sheet at a temperature equal to or higher than a melting point, and then solidifying the hot-melt sheet at a temperature equal to or lower than the inciting point, the adherends can be joined to each other via the hot-melt sheet. The hot-melt resin does not contain a polar solvent, a solvent, or water. Therefore, the hot-melt resin does not deliquesce a deliquescent phosphor layer (for example, a phosphor layer having a columnar crystal structure formed of an alkali halide) even if the hot-melt resin comes into contact with the phosphor layer, and therefore is suitable for joining the photoelectric conversion element and the phosphor layer to each other. In addition, the hot-melt sheet does not contain a residual volatile matter, and therefore shrinks a little due to drying and also has excellent gap filling property and dimensional stability.

Specific examples of the hot-melt sheet include those based on a resin such as a polyolefin-based resin, a polyamide-based resin, a polyester-based resin, a polyurethane-based resin, an acrylic resin, or an EVA-based resin depending on a main component. Among these sheets, those based on a polyolefin-based resin, an EVA-based resin, or an acrylic resin are preferable from viewpoints of light transmittance and adhesiveness.

The light transmitting material layer may be a pressure-sensitive adhesive sheet. Specific examples of the pressure-sensitive adhesive sheet include those containing an acrylic resin, a urethane-based resin, a rubber-based resin, a silicone-based resin, or the like as a main component. Among these sheets, those containing an acrylic resin or a silicone-based resin as a main component are preferable from viewpoints of light transmittance and adhesiveness.

In a case where the light transmitting material layer is formed of a thermosetting resin, the thermosetting resin is applied onto the scintillator layer or the photoelectric conversion element by a technique such as spin coating, screen printing, a dispenser, or the like.

In a case where the light transmitting material layer is formed of a hot-melt sheet, the light transmitting material layer is formed by inserting the hot-melt sheet between the laminated scintillator and the photoelectric conversion element and heating the hot-melt sheet under reduced pressure.

The pressure-sensitive adhesive sheet is bonded by a lamination device or the like.

Furthermore, the light transmitting material layer may be formed of a fiber optic plate (FOP). FOP is an optical device with a bundle of optical fibers of several μm, and can propagate incident light to the photoelectric conversion element at high efficiency and low distortion. In addition, FOP has a high radiation shielding effect, and can prevent radiation damage to various elements constituting a photodetector used in a radiation image converter.

A commercially available one can be selected for FOP based on a radiation shielding ratio thereof, a visible light transmittance thereof, and the like. FOP is joined to a partitioned scintillator and the photoelectric conversion element panel via a connecting member. As the connecting member, a double-sided pressure-sensitive adhesive sheet, a liquid curing type pressure-sensitive adhesive, an adhesive, or the like is used. An optical pressure-sensitive adhesive sheet or a pressure-sensitive adhesive is particularly preferably used. As the adhesive, either an organic material or an inorganic material may be used. For example, an acrylic material, an epoxy-based material, a silicone-based material, a natural rubber-based material, a silica-based material, a urethane-based material, an ethylene-based material, a polyolefin-based material, a polyester-based material, a polyurethane-based material, a polyamide-based material, a cellulose-based material, and the like are appropriately used. These materials can be used singly or in mixture thereof. In addition, as the structure of the pressure-sensitive adhesive sheet, a sheet in which pressure-sensitive adhesive layers are formed on both sides of a core material such as PET, a sheet formed as a single-layer pressure-sensitive adhesive layer without a core material, and the like are used.

If the refractive index of the light transmitting material layer is represented by $n3$, a relationship between $n3$ and the refractive index $n2$ of the non-scintillator layer preferably further satisfies a relationship represented by formula (C). If this relationship is satisfied, light emitted from the scintillator can be efficiently guided to a detector.

$$1.0 < (n_3/n_2) \qquad (C)$$

According to an embodiment of the present invention as described above, it is possible to provide a laminated scintillator panel capable of increasing the area and the layer thickness with a concept completely different from use of a silicon wafer.

According to an embodiment of the present invention, the refractive indices of the scintillator layer and the non-scintillator layer are adjusted, and therefore light can be transmitted to a detector via the non-scintillator layer. As a result, brightness or sharpness is not lowered. In addition, this laminated scintillator panel can also increase the area and the layer thickness, which has been conventionally difficult, and can arbitrarily adjust a lamination pitch. Therefore, the laminated scintillator panel according to an embodiment of the present invention can be used as various partitioned scintillators including a scintillator used for a Talbot system. In addition, by changing the scintillator layer according to an embodiment of the present invention to a high X-ray absorbing layer containing a heavy metal or the like, the laminated scintillator panel according to an embodiment of the present invention can also be applied to methods for manufacturing various gratings for Talbot, such as a G0 grating, a G1 grating, and a G2 grating.

Figure 3:
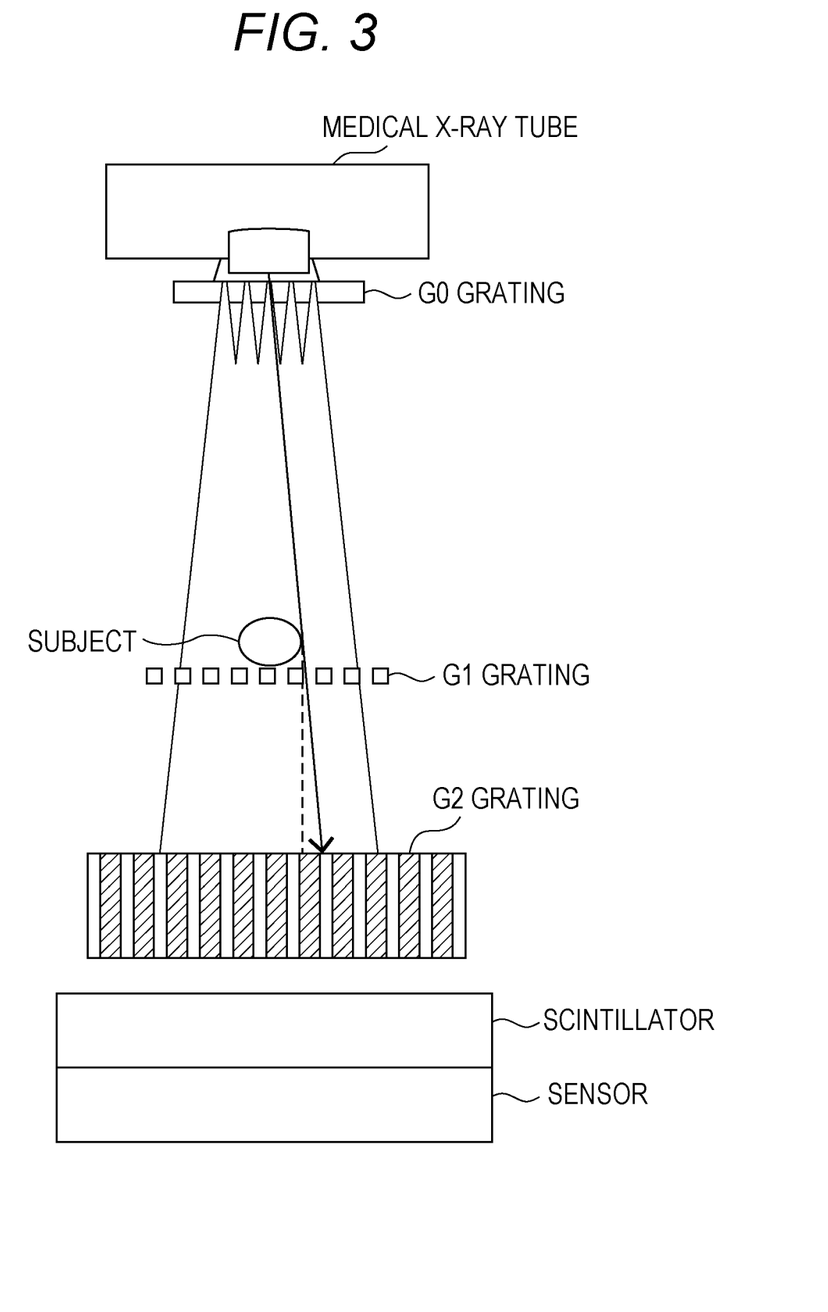
FIG. 3 is a schematic configuration diagram of a Talbot scintillator using the scintillator panel according to an embodiment of the present invention.

In the scintillator according to an embodiment of the present invention, the scintillator panel already has a function of the G2 grating, and therefore the scintillator can be used even while the G2 grating is removed from the device as illustrated in FIG. 3. Incidentally, the Talbot imaging device is described in detail in JP 2016-220865 A, JP 2016-220787 A, JP 2016-209017 A, JP 2016-150173 A, and the like.

EXAMPLES

Hereinafter, the present invention will be described with reference to Examples, but the present invention is not limited to such Examples at all.

Example 1

$Gd_2O_2S$:Tb particles having an average particle diameter of 2 μm and a binder resin (polyurethane resin: refractive index 1.4) were mixed in a MEK solvent so as to have a solid content ratio (volume fraction) of (50:50) to obtain a composition for forming a scintillator layer. A top surface of a transparent resin film (non-scintillator layer) made of polyethylene terephthalate having a theoretical film thickness of 2.7 μm (calculated from the weight) and having a refractive index of 1.6 was coated with this composition so as to have a theoretical film thickness of 2.6 μm (calculated from the weight) to prepare a partial laminate formed of a scintillator layer and a non-scintillator layer.

Thereafter, 20,000 pieces obtained by cutting the partial laminate into pieces of 120 mm×3 mm were laminated. The measured film thickness of this laminate was 140 mm. Subsequently, the laminate was pressurized in parallel to a lamination surface under a pressure of 0.2 GPa using a metallic jig such that the film thickness of the laminate was 120 mm. Furthermore, the laminate was heated in this state at 100° C. for one hour to prepare a laminated block (120 mm×120 mm×3 mm) formed of the 20,000-layer partial laminate.

The porosity in the scintillator layer was calculated from the amounts and layer thicknesses of the phosphor particles and the binder resin, and an average refractive index was calculated from a ratio between the binder resin and voids in the scintillator layer.

One side (surface of 120 mm×120 mm) of the laminated block was flattened by lathe machining, and then an epoxy adhesive was applied thereto, and the side was bonded to a CFRP plate having a thickness of 0.5 mm. Thereafter, the laminated block was cut by lathe machining until the thickness of the laminated block became 0.3 rum to obtain a laminated scintillator panel (120 mm×120 mm×0.3 mm).

Example 2

A laminated scintillator panel was prepared in a similar manner to Example 1 except that a polystyrene resin (refractive index 1.6) was used as the binder resin, and a transparent resin film made of a low refractive acrylate having a refractive index of 1.4 was used as the non-scintillator layer in Example 1.

Comparative Example 1

A laminated scintillator panel was prepared in a similar manner to Example 1 except that a fluorocarbon resin (refractive index 1.3) was used as the binder resin, and a transparent resin film made of transparent polyimide having a refractive index of 1.7 was used as the non-scintillator layer in Example 1.

Comparative Example 2

A laminated scintillator panel was prepared in a similar manner to Example 1 except that a high refractive acrylate (refractive index 1.7) was used as the binder resin, and a transparent resin film made of a fluorocarbon resin having a refractive index of 1.3 was used as the non-scintillator layer in Example 1.

<Brightness Evaluation>

Each a the prepared laminated scintillator panels was set on a CMOS flat panel (X-ray CMOS camera system Shad-o-Box6KHS manufactured by Teledyne Rad-icon Imaging Corporation), a distance between the laminated scintillator panel and an X-ray tube was set to 172 cm, and the laminated scintillator panel was irradiated with an X-ray having a tube voltage of 60 kvp. From the obtained X-ray image data, an average signal value over the entire X-ray image was determined as the brightness of the scintillator panel, and a relative value determined by assuming the brightness of Comparative Example 2 to be 1 was calculated as relative brightness.

<Sharpness>

Next, a sensor panel in which photoelectric conversion elements each including a photodiode and a TFT and each having a pixel size of 100 µm×100 µm were arranged in a matrix on a glass substrate (alkali-free glass having a thickness of 0.5 mm) for forming a sensor was prepared. Alignment was performed such that the laminated scintillator and the photoelectric conversion elements of the sensor panel faced to each other, and the laminated scintillator was joined to the sensor panel via an adhesive layer made of a hot melt resin and having a thickness of 5.3 µm to prepare an X-ray detector.

The scintillator panel was irradiated with an X-ray through an MTF chart made of lead using an X-ray irradiation apparatus in which a tube voltage was set to 80 kVp, and image data detected by a CMOS flat panel was recorded on a hard disk. Thereafter, the recorded image data on the hard disk was analyzed by a computer, and a modulation transfer function MTF (MTF value at one spatial frequency cycle/mm) of the X-ray image recorded on the hard disk was determined. A relative value determined by assuming an MTF value of Comparative Example 2 to be 1 was calculated as relative sharpness.

The results are also illustrated in Table 1.

TABLE 1

|  | Refractive index Binder resin | Refractive index Air | Refractive index n1 Average of binder resin and voids | Refractive index n2 Transparent resin layer | n2/n1 | Relative brightness | Relative sharpness |
| --- | --- | --- | --- | --- | --- | --- | --- |
| Comparative Example 1 | 1.3 | 1.0 | 1.3 | 1.7 | 1.3 | 1.6 | 0.9 |
| Example 1 | 1.4 | 1.0 | 1.4 | 1.6 | 1.2 | 1.5 | 1.0 |
| Example 2 | 1.6 | 1.0 | 1.5 | 1.4 | 0.9 | 1.3 | 1.0 |
| Comparative Example 2 | 1.7 | 1.0 | 1.6 | 1.3 | 0.8 | 1.0 | 1.0 |

According to an embodiment of the present invention, it is possible to provide a scintillator panel having high brightness and MTF. Such a scintillator panel according to an embodiment of the present invention can be suitably used for a Talbot system.

Therefore, the scintillator panel according to an embodiment of the present invention can also perform imaging at a high voltage and also can image a thick subject such as a thoracoabdominal part, a thigh part, an elbow joint, a knee joint, or a hip joint.

Conventionally, in image diagnosis for cartilage, MRI is mainly used, and there are disadvantages that imaging cost is high because of use of large-scale equipment and imaging time is long. Meanwhile, according to an embodiment of the present invention, it is possible to image a soft tissue such as cartilage, muscle tendon, or ligament and a visceral tissue with a faster X-ray image at lower cost. Therefore, wide applications to, for example, image diagnosis for an orthopedic disease such as rheumatoid arthritis or gonarthrosis, breast cancer, and a soft tissue can be expected.

Although embodiments of the present invention have been described and illustrated in detail, the disclosed embodiments are made for purposes of illustration and example only and not limitation. The scope of the present invention should be interpreted by terms of the appended claims. Needless to say, the purpose, state, use, function, and other specifications can be modified appropriately, and the present invention can be implemented according to another embodiment.

What is claimed is:

1. A scintillator panel comprising a laminated scintillator having a structure obtained by repeatedly disposing a scintillator layer and a non-scintillator layer in a direction substantially parallel to an incident direction of a radiation, wherein
the scintillator layer contains at least a phosphor, a binder resin, and voids, and the non-scintillator layer is transparent, and
an average refractive index n1 of the binder resin and the voids of the scintillator layer and a refractive index n2 of the non-scintillator layer satisfy a relationship of formula (A) $0.9 \leq (n2/n1)$.

2. The scintillator panel according to claim 1, wherein the non-scintillator layer contains a transparent resin.

3. The scintillator panel according to claim 1, wherein the non-scintillator layer contains transparent fine particles in a range of 0.5 to 10% by mass together with a transparent resin.

4. The scintillator panel according to claim 1, further satisfying the following formula (B):

$$0.9 \leq (n2/n1) \leq 1.2. \qquad \text{formula (B)}$$

5. The scintillator panel according to claim 1, further comprising a photoelectric conversion sensor, wherein
a light detection pixel (also referred to as a detector pixel, P1) formed in the photoelectric conversion sensor and a thickness (lamination pitch, P2) of a pair of scintillator layer and non-scintillator layer in a direction perpendicular to the incident direction satisfy P1>P2.

6. The scintillator panel according to claim 1, wherein a layer made of a light transmitting resin material is disposed between the laminated scintillator and the photoelectric conversion sensor.

* * * * *